United States Patent
Imamura et al.

(10) Patent No.: US 10,294,339 B2
(45) Date of Patent: May 21, 2019

(54) METHOD FOR PRODUCING MODIFIED MOLDED ARTICLE OF FLUORORESIN

(71) Applicant: DAIKIN INDUSTRIES, LTD., Osaka-shi, Osaka (JP)

(72) Inventors: Hitoshi Imamura, Osaka (JP); Tatsuya Funaoka, Osaka (JP); Hideki Kono, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 6 days.

(21) Appl. No.: 15/528,559

(22) PCT Filed: Jan. 18, 2016

(86) PCT No.: PCT/JP2016/051248
§ 371 (c)(1),
(2) Date: May 22, 2017

(87) PCT Pub. No.: WO2016/117492
PCT Pub. Date: Jul. 28, 2016

(65) Prior Publication Data
US 2017/0260344 A1 Sep. 14, 2017

(30) Foreign Application Priority Data
Jan. 20, 2015 (JP) .................... 2015-008664

(51) Int. Cl.
C08J 3/28 (2006.01)
C08F 214/26 (2006.01)
C08J 7/12 (2006.01)

(52) U.S. Cl.
CPC ............ C08J 3/28 (2013.01); C08F 214/262 (2013.01); C08J 7/123 (2013.01); *C08J 2327/18* (2013.01)

(58) Field of Classification Search
CPC ........... C08J 3/28; C08J 7/123; C08F 214/262
See application file for complete search history.

(56) References Cited

FOREIGN PATENT DOCUMENTS

| JP | 07-118423 | * | 5/1995 |
| JP | 11-049867 | * | 2/1999 |
| JP | 11-49867 | A | 2/1999 |
| JP | 11-349711 | * | 12/1999 |
| JP | 11-349711 | A | 12/1999 |
| JP | H11-349711 | * | 12/1999 |
| JP | 2000-186162 | A | 7/2000 |
| JP | 2002-030166 | * | 1/2002 |
| JP | 2002-30166 | A | 1/2002 |
| JP | 2002-327068 | A | 11/2002 |
| JP | 2007-137982 | * | 6/2007 |
| JP | 2007-137982 | A | 6/2007 |
| JP | 2008-231330 | * | 10/2008 |
| JP | 2008-231330 | A | 10/2008 |
| JP | 2008-231331 | A | 10/2008 |
| JP | 2010-155443 | A | 7/2010 |
| JP | 2011-105012 | A | 6/2011 |

OTHER PUBLICATIONS

Translation of International Preliminary Report on Patentability issued from the International Bureau in counterpart International Application No. PCT/JP2016/051248, dated Jul. 25, 2017.
International Search Report for PCT/JP2016/051248, dated Mar. 8, 2016.

* cited by examiner

*Primary Examiner* — Peter D. Mulcahy
(74) *Attorney, Agent, or Firm* — Sughrue Mion, PLLC

(57) ABSTRACT

A method for producing a modified molded article which includes molding a fluororesin to provide a molded article and irradiating the molded article with radiation at an irradiation dose of lower than 100 kGy at 50° C. to 200° C. to provide a modified molded article.

8 Claims, No Drawings

METHOD FOR PRODUCING MODIFIED MOLDED ARTICLE OF FLUORORESIN

This Application is a National Stage of International Application No. PCT/JP2016/051248 filed Jan. 18, 2016, claiming priority based on Japanese Patent Application No. 2015-008664 filed Jan. 20, 2015, the contents of all of which are incorporated herein by reference in their entirety.

TECHNICAL FIELD

The present invention relates to methods for producing a modified molded article of fluororesin.

BACKGROUND ART

Fluororesins have excellent properties such as heat resistance, chemical resistance, weather resistance, and stain resistance, and are used in various fields such as semiconductors, automobiles, architecture, electrics and electronics, chemical plants, and medicine-related industries. Various methods of further improving the properties, such as heat resistance, mechanical properties, and radiation resistance, of fluororesins are studied.

One known method of modifying fluororesin is irradiation. A commonly known example of such a modifying method is a method in which a fluororesin is heated up to a temperature of not lower than the melting point thereof and then the fluororesin is irradiated with radiation (Patent Literature documents 1 and 2).

Patent Literature 3 discloses a method of producing a modified fluororesin without pre-heating, including irradiating the resin with ionizing radiation having a dose rate as high as 100 kGy/sec or higher from a particle accelerator at a predetermined irradiation dose of 200 kGy to 100 MGy to crosslink the resin, thereby easily improving the heat resistance and the chemical resistance in a short time.

Patent Literature 4 discloses that the heat-aging resistance and compression-set resistance are improved by irradiating a fluororesin heated up to 0° C. to 150° C. or up to 0° C. to the crystal dispersion temperature thereof with ionizing radiation at an irradiation dose of 5 Gy to 500 kGy and maintaining the irradiated fluororesin at a predetermined temperature for a predetermined period of time.

Patent Literature documents 5 to 7 disclose that a tetrafluoroethylene/perfluoro(alkyl vinyl ether) copolymer having a heat of crystal fusion within a specific range or a composition containing the copolymer is irradiated with ionizing radiation of 10 kGy or higher at an irradiating condition of 100° C. or lower.

Patent Literature 8 discloses a method of producing a modified fluororesin molded article including, for example, applying a fluororesin onto a metal substrate, which is less likely to bond to the fluororesin, irradiating the fluororesin with ionizing radiation at 200° C. to 400° C. to crosslink the fluororesin, and peeling or separating the fluororesin from the substrate.

Patent Literature 9 discloses a method of producing a composite material including a crosslinked fluororesin layer having excellent abrasion resistance and adhesion with a substrate, including the steps of: forming a fluororesin layer on a substrate; heating the fluororesin layer up to a temperature within the range from the melting point of the fluororesin to the temperature 150° C. higher than the melting point and sintering the fluororesin layer; adjusting the temperature of the sintered non-crosslinked fluororesin layer to a temperature within the range from the temperature 60° C. lower than the melting point (Tm) of the fluororesin to the temperature 1° C. lower than the melting point; and irradiating the fluororesin with radiation to crosslink the fluororesin.

Patent Literature 10 discloses a material covered with a modified fluororesin including a crosslinked fluororesin film covering a substrate having thermal stability at a temperature of not lower than the melting point of the fluororesin, wherein the fluororesin is crosslinked by ionizing radiation at a temperature within the range from 250° C. to 400° C.

CITATION LIST

Patent Literature

Patent Literature 1: JP H11-49867 A
Patent Literature 2: JP 2000-186162 A
Patent Literature 3: JP H11-349711 A
Patent Literature 4: JP 2002-327068 A
Patent Literature 5: JP 2007-137982 A
Patent Literature 6: JP 2008-231330 A
Patent Literature 7: JP 2008-231331 A
Patent Literature 8: JP 2002-30166 A
Patent Literature 9: JP 2010-155443 A
Patent Literature 10: JP 2011-105012 A

SUMMARY OF INVENTION

Technical Problem

Molded articles for flowing or storing gas or chemicals need to have characteristics which are less likely to allow gas or chemicals to permeate through the articles.

However, conventional methods of irradiating fluororesin have difficulty in providing fluororesin molded articles which are less likely to allow nitrogen gas and hydrochloric acid to permeate therethrough. In particular, when any conventional method is used for the purpose of lowering the permeability by irradiating a molded article having a small thickness, the molded article suffers from creases or the breaking strength thereof is impaired. Thus, the field of the art desires a method of producing a fluororesin molded article having a small thickness, favorable appearance, and high breaking strength, as well as excellently low permeability to nitrogen gas and hydrochloric acid.

In view of the above state of the art, the present invention aims to provide a method for producing a modified molded article that has favorable appearance, high breaking strength, and excellent abrasion resistance, as well as excellently low permeability to nitrogen gas and hydrochloric acid.

Solution to Problem

The inventors have performed studies about the above solution to the problem to find that irradiating a molded article of fluororesin at a specific irradiation dose and a specific temperature prevents generation of creases and impairment of the breaking strength even if the molded article has a small thickness, and simultaneously improves the abrasion resistance and significantly lowers the nitrogen gas permeation coefficient and the hydrochloric acid permeation coefficient, thereby completing the present invention.

Specifically, the present invention relates to a method for producing a modified molded article including: molding a fluororesin to provide a molded article; and irradiating the molded article with radiation at an irradiation dose of lower than 100 kGy at 50° C. to 200° C. to provide a modified molded article.

The molded article preferably has a thickness of 0.01 to 3.0 mm.

The molded article is preferably a tube, a film, or a bottle.

The modified molded article preferably has a specific gravity of 2.14 to 2.30.

The fluororesin is preferably a melt-fabricable fluororesin.

The fluororesin is preferably a tetrafluoroethylene/perfluoro(alkyl vinyl ether) copolymer.

The fluororesin preferably contains 500 or less functional groups per $10^6$ carbon atoms in the main chain.

The present invention also relates to a modified molded article which is obtainable by the above production method.

The present invention also relates to a molded article including a melt-fabricable fluororesin excluding polytetrafluoroethylene and polychlorotrifluoroethylene, containing no inorganic substance or no polytetrafluoroethylene, having a specific gravity of 2.170 or higher, and having a breaking strength of 13 MPa or higher (hereinafter, this molded article is also referred to as a molded article (A)).

Advantageous Effects of Invention

The production method of the present invention can provide a modified molded article having favorable appearance, high breaking strength, and excellent abrasion resistance, as well as excellently low permeability to nitrogen gas and hydrochloric acid.

The modified molded article of the present invention has favorable appearance, high breaking strength, and excellent abrasion resistance, as well as excellently low permeability to nitrogen gas and hydrochloric acid.

The molded article (A) of the present invention has favorable appearance, high breaking strength, and excellent abrasion resistance, as well as excellently low permeability to nitrogen gas and hydrochloric acid.

DESCRIPTION OF EMBODIMENTS

The present invention will be specifically described hereinbelow.

The production method of the present invention includes molding a fluororesin to provide a molded article and irradiating the resulting molded article with radiation at an irradiation dose of lower than 100 kGy at 50° C. to 200° C.

The irradiation temperature of the radiation is 50° C. to 200° C. It is preferably 80° C. or higher, more preferably 100° C. or higher, still more preferably 140° C. or higher, while preferably 180° C. or lower. Too high an irradiation temperature generates creases on the modified molded article or impairs the breaking strength. Too low an irradiation temperature causes a failure in producing a modified molded article having low permeability and excellent abrasion resistance.

Preferably, the irradiation temperature is within the above range and is lower than the melting point of the fluororesin.

The irradiation temperature may be adjusted by any known method. Specific examples thereof include a method in which the fluororesin is held in a heating furnace maintained at a predetermined temperature and a method in which the fluororesin is placed on a hotplate, and then the hotplate is heated by applying an electric current to a built-in heater of the hotplate or by means of an external heater.

The irradiation dose of the radiation is lower than 100 kGy. It is preferably 95 kGy or lower, more preferably 80 kGy or lower, while preferably 20 kGy or higher, more preferably 40 kGy or higher, still more preferably 60 kGy or higher. Too high or too low an irradiation dose causes a failure in producing a modified molded article having favorable appearance, high breaking strength, and excellent abrasion resistance, as well as excellently low permeability to nitrogen gas and hydrochloric acid.

Examples of the radiation include electron beams, ultraviolet rays, gamma rays, X-rays, neutron beams, and high energy ions. For excellent penetration, a high dose rate, and suitable industrial productivity, electron beams are preferred.

The irradiation may be performed by any method, such as a method using a conventionally known irradiating device.

The irradiation may be performed in any environment. The irradiation environment is preferably an environment having an oxygen concentration of 1000 ppm or lower, is more preferably free from oxygen, is still more preferably in vacuo or in an atmosphere of inert gas such as nitrogen, helium, or argon.

In conventional methods, a molded article of fluororesin is irradiated so that the fluororesin is crosslinked and the molded article is modified. In contrast, the production method of the present invention is performed under conditions that hardly progress such crosslinking. Although it is not clarified, the reason why the production method of the present invention can provide a modified molded article having excellently low permeability to nitrogen gas and hydrochloric acid without impairing the appearance and the breaking strength is presumably that the crystallinity of the molded article is improved. One reason of this presumption is that the modified molded article obtained by the production method of the present invention has a higher specific gravity than the molded article before the irradiation.

The production method of the present invention includes molding a fluororesin to provide a molded article.

The fluororesin may be molded by any method, and examples of the molding method include known methods such as extrusion molding, injection molding, transfer molding, inflation molding, and compression molding. The molding method may be appropriately selected therefrom in accordance with the shape of the target molded article.

The method of molding the fluororesin is preferably extrusion molding, compression molding, or injection molding, more preferably extrusion molding. Any of these molding methods enable easy production of a molded article such as a tube, a film, or a bottle. The methods also enable easy production of a molded article, such as a tube, a film, or a bottle, having a small thickness. In these molding methods, a fluororesin is heated to flow and then is molded. Thus, in the resulting molded article, the polymer chains constituting the fluororesin are oriented in the flowing direction. When the molded article is heated, it is likely to shrink in the flowing direction. If the molded article shrinks too much, the appearance thereof is impaired. In particular, a molded article obtained by extrusion molding significantly shrinks. The production method of the present invention can suppress such shrinkage of a molded article, and can provide a modified molded article having favorable appearance.

The thickness of the molded article is preferably 0.01 to 3.0 mm, more preferably 0.2 mm or greater, still more preferably 0.5 mm or greater, particularly preferably 1.0 mm or greater, while more preferably 2.0 mm or smaller. Since a molded article having a small thickness is likely to allow nitrogen gas and hydrochloric acid to permeate therethrough, it is desired to lower the permeation coefficients to nitrogen gas and hydrochloric acid. Also, since a molded article having a small thickness does not originally have high breaking strength, it is particularly desired to avoid impairment of the breaking strength due to irradiation. However, irradiation of a molded article having a small thickness by any conventional method impairs the breaking strength or causes shrinkage of a molded article to generate creases on the surface, resulting in a failure in producing a molded article having favorable appearance. In contrast, the production method of the present invention can provide a modified molded article having favorable appearance and high breaking strength, as well as excellently low permeability to nitrogen gas and hydrochloric acid even if the thickness is within the above range.

The molded article may be in any shape or form, such as pellets, a film, a sheet, a plate, a rod, a block, a cylinder, a container, an electric wire, or a tube. The molded article may be a fluororesin coating film for forming, for example, a coating layer for cookware, such as an inner pot of a rice cooker, an electric griddle, or a frying pan, or a top coat layer of a fixing roller for an image forming device such as an electrophotographic type or electrostatic recording type copier or a laser printer. The fluororesin coating film may be formed by applying a fluororesin coating to a substrate.

The molded article is preferably a tube, a film, or a bottle. Tubes, films, and bottles are usually produced by extrusion molding, compression molding, or injection molding, and particularly produced by extrusion molding in many cases. Thus, in tubes, films, and bottles, the polymer chains constituting the fluororesin are oriented in the flowing direction. When these molded articles are heated, they are likely to shrink in the flowing direction. If they shrink too much, the appearance thereof is impaired. In contrast, even if the molded article is a tube, a film, or a bottle, the production method of the present invention can suppress such shrinkage of a molded article, and can provide a modified molded article having favorable appearance.

The production method of the present invention may include extrusion molding, compression molding, or injection molding a fluororesin to provide a tube, a film, or a bottle having a thickness within the above range and irradiating the tube, the film, or the bottle with radiation at an irradiation dose within the above range and at an irradiation temperature within the above range. This production method can produce a tube, a film, or a bottle having a thickness of 3.0 mm or smaller, preferably 2.5 mm or smaller, more preferably 2.0 mm or smaller, and can provide a modified molded article having favorable appearance as well as excellently low permeability to nitrogen gas and hydrochloric acid.

The fluororesin preferably has a melting point of 190° C. to 347° C. The melting point is more preferably 200° C. or higher, still more preferably 220° C. or higher, particularly preferably 280° C. or higher, while more preferably 322° C. or lower. The melting point is the temperature corresponding to the maximum value on a heat-of-fusion curve at a temperature-increasing rate of 10° C./min using a differential scanning calorimeter (DSC).

Examples of the fluororesin include polytetrafluoroethylene, copolymers containing a tetrafluoroethylene unit (TFE unit) and a perfluoro(alkyl vinyl ether) unit, copolymers containing a TFE unit and a hexafluoropropylene unit, and polychlorotrifluoroethylene.

The fluororesin is preferably a melt-fabricable fluororesin, more preferably at least one copolymer selected from the group consisting of copolymers containing a tetrafluoroethylene unit (TFE unit) and a perfluoro(alkyl vinyl ether) unit (PAVE unit) (hereinafter, referred to as TFE/PAVE copolymers (or PFA)) and copolymers containing a TFE unit and a hexafluoropropylene unit (HFP unit) (hereinafter, referred to as TFE/HFP copolymers (or FEP)), still more preferably a TFE/PAVE copolymer.

The PAVE constituting the TFE/PAVE copolymer may be at least one selected from the group consisting of those represented by the following formula (1):

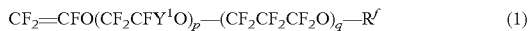

$$CF_2=CFO(CF_2CFY^1O)_p-(CF_2CF_2CF_2O)_q-R^f \quad (1)$$

(wherein $Y^1$ is F or $CF_3$; $R^f$ is a C1-C5 perfluoroalkyl group; p is an integer of 0 to 5; and q is an integer of 0 to 5) and those represented by the following formula (2):

$$CFX=CXOCF_2OR^1 \quad (2)$$

(wherein Xs may be the same as or different from each other, and are each H, F, or $CF_3$; $R^1$ is a linear or branched C1-C6 fluoroalkyl group which may optionally have one or two atom(s) that is/are at least one selected from the group consisting of H, Cl, Br, and I, or a C5-C6 cyclic fluoroalkyl group which may optionally have one or two atom(s) that is/are at least one selected from the group consisting of H, Cl, Br, and I).

A copolymer containing a PAVE unit can further lower the permeability to nitrogen gas and hydrochloric acid. This is presumably because a large number of large side chains, which are alkoxy groups, show a large molecular motion even at low temperature, so that the effect of irradiation can be sufficiently achieved even at low temperature.

The PAVE is preferably one having a bulky side chain, specifically preferably perfluoro(propyl vinyl ether) (PPVE).

The TFE/PAVE copolymer preferably contains 1.0 to 10 mass % of a polymerized unit based on PAVE relative to all the polymerized units.

The amount of the polymerized unit based on PAVE is more preferably 2.0 mass % or more, still more preferably 3.5 mass % or more, particularly preferably 4.0 mass % or more, most preferably 5.0 mass % or more, while more preferably 8.0 mass % or less, still more preferably 7.0 mass % or less, particularly preferably 6.5 mass % or less, most preferably 6.0 mass % or less, relative to all the polymerized units.

The amount of the polymerized unit based on PAVE is determined by $^{19}$F-NMR.

The TFE/PAVE copolymer preferably has a melting point of 280° C. to 322° C.

The melting point is more preferably 290° C. or higher and 315° C. or lower.

The melting point is the temperature corresponding to the maximum value on a heat-of-fusion curve at a temperature-increasing rate of 10° C./min using a differential scanning calorimeter (DSC).

The TFE/PAVE copolymer preferably has a glass transition temperature (Tg) of 70° C. to 110° C.

The glass transition temperature is more preferably 80° C. or higher and 100° C. or lower.

The glass transition temperature is a value obtained by dynamic viscoelasticity measurement.

The TFE/PAVE copolymer may be produced by any conventionally known method, such as a method in which monomers to give the constitutional units of the copolymer and additives such as a polymerization initiator are appropriately mixed so that the monomers are emulsion polymerized or suspension polymerized.

The TFE/HFP copolymer contains a tetrafluoroethylene (TFE) unit and a hexafluoropropylene (HFP) unit.

The TFE/HFP copolymer preferably satisfies a mass ratio (TFE/HFP) between the TFE unit and the HFP unit of (70 to 99)/(1 to 30) (mass %). The mass ratio (TFE/HFP) is more preferably (85 to 95)/(5 to 15) (mass %).

The TFE/HFP copolymer preferably further contains a perfluoro(alkyl vinyl ether) (PAVE) unit. The presence of a PAVE unit can further lower the permeability.

Examples of the PAVE unit to be contained in the TFE/HFP copolymer include the same units as those for the PAVE unit constituting the above TFE/PAVE copolymer.

In order to excellently lower the permeability, PPVE is more preferred.

The aforementioned TFE/PAVE copolymer contains no HFP unit, and thus is different from a TFE/HFP/PAVE copolymer in this respect.

If the TFE/HFP copolymer is a copolymer containing a TFE unit, a HFP unit, and a PAVE unit (hereinafter, also referred to as a "TFE/HFP/PAVE copolymer"), the mass ratio (TFE/HFP/PAVE) is preferably (70 to 99.8)/(0.1 to 25)/(0.1 to 25) (mass %). If the mass ratio is within the above range, the heat resistance and the chemical resistance may be excellent.

The mass ratio (TFE/HFP/PAVE) is more preferably (75 to 98)/(1.0 to 15)/(1.0 to 10) (mass %).

The TFE/HFP/PAVE copolymer contains 1 mass % or more in total of the HFP unit and the PAVE unit.

The TFE/HFP/PAVE copolymer preferably contains 25 mass % or less of the HFP unit in all the monomer units.

If the amount of the HFP unit is within the above range, the resulting modified molded article may have excellent heat resistance.

The amount of the HFP unit is more preferably 20 mass % or less, still more preferably 18 mass % or less, particularly preferably 15 mass % or less. The amount of the HFP unit is preferably 0.1 mass % or more, more preferably 1 mass % or more, particularly preferably 2 mass % or more.

The amount of the HFP unit can be determined by $^{19}$F-NMR.

The amount of the PAVE unit is more preferably 20 mass % or less, still more preferably 10 mass % or less, particularly preferably 3 mass % or less. The amount of the PAVE unit is preferably 0.1 mass % or more, more preferably 1 mass % or more. The amount of the PAVE unit can be determined by $^{19}$F-NMR.

The TFE/HFP copolymer may further contain another ethylenic monomer (a) unit.

The ethylenic monomer (a) unit may be any monomer unit copolymerizable with the TFE unit, the HFP unit, and the PAVE unit. Examples thereof include ethylenic fluorine-containing monomers such as vinyl fluoride (VF), vinylidene fluoride (VdF), chlorotrifluoroethylene (CTFE), and ethylene (ETFE), and non-fluorinated ethylenic monomers such as ethylene, propylene, and alkyl vinyl ethers.

If the copolymer is a copolymer of TFE/HFP/PAVE/ethylenic monomer (a), the mass ratio (TFE/HFP/PAVE/ethylenic monomer (a)) is preferably (70 to 98)/(0.1 to 25)/(0.1 to 25)/(0.1 to 25) (mass %).

In the TFE/HFP copolymer, the sum of the amounts of the polymerized units other than the TFE unit is 1 mass % or more.

The TFE/HFP copolymer preferably has a melting point of 200° C. to 322° C. If the melting point is lower than 200° C., the effects of irradiation may not be sufficiently achieved. If the melting point is higher than 322° C., the main chain may be cleaved so that the polymer may be divided into low-molecular-weight molecules, possibly resulting in a great reduction in mechanical strength. The melting point is more preferably higher than 200° C., still more preferably 220° C. or higher, while more preferably 300° C. or lower, still more preferably 280° C. or lower. The melting point is the temperature corresponding to the maximum value on a heat-of-fusion curve at a temperature-increasing rate of 10° C./min using a differential scanning calorimeter (DSC).

The TFE/HFP copolymer preferably has a glass transition temperature (Tg) of 60° C. to 110° C., more preferably 65° C. or higher and 100° C. or lower. The glass transition temperature is a value obtained by dynamic viscoelasticity measurement.

The TFE/HFP copolymer may be produced by any conventionally known method, such as a method in which monomers to give the constitutional units of the copolymer and additives such as a polymerization initiator are appropriately mixed so that the monomers are emulsion polymerized, solution polymerized, or suspension polymerized.

The fluororesin may also preferably include the TFE/PAVE copolymer and the TFE/HFP copolymer. In other words, the fluororesin may be an admixture of the TFE/PAVE copolymer with the TFE/HFP copolymer. The mass ratio ((A)/(B)) between the TFE/PAVE copolymer and the TFE/HFP copolymer is preferably 1/9 to 7/3. The mass ratio is more preferably 5/5 to 2/8.

The above mixture is preferably prepared by any known method such as a method in which two or more of the fluororesins having different melting points are melt-mixed (melt-kneaded) or a method in which resin dispersions after emulsion polymerization are mixed, the resins are coagulated with an acid such as nitric acid, and the coagulated resins are collected. The melt-mixing can be performed at a temperature of not lower than the highest melting point among the melting points of the fluororesins.

In order to provide a modified molded article having favorable appearance as well as excellently low permeability to nitrogen gas and hydrochloric acid, the fluororesin is preferably a TFE/PAVE copolymer, more preferably a copolymer consisting only of a TFE unit and a PAVE unit. The TFE/PAVE copolymer preferably contains 1.0 to 10 mass % of the PAVE unit relative to all the polymerized units. The amount of the PAVE unit is more preferably 2.0 mass % or more, still more preferably 3.5 mass % or more, particularly preferably 4.0 mass % or more, most preferably 5.0 mass % or more, while more preferably 8.0 mass % or less, still more preferably 7.0 mass % or less, particularly preferably 6.5 mass % or less, most preferably 6.0 mass % or less, relative to all the polymerized units.

The fluororesin preferably has a melt flow rate (MFR) of 0.1 to 100 g/10 min at 372° C. If the MFR is within the above range, the irradiation may significantly exhibit the effects thereof. The MFR is more preferably 0.5 g/10 min or more, while more preferably 80 g/10 min or less, still more preferably 40 g/10 min or less. The MFR is a value determined as the mass (g/10 min) of the polymer flowed out of a nozzle (inner diameter: 2 mm, length: 8 mm) per 10 minutes at 372° C. and 5 kg load using a melt indexer (Yasuda Seiki Seisakusho Ltd.) in conformity with ASTM D1238.

In general, the presence of a fluororesin containing many TFE units and having a low MFR leads to production of a molded article having excellently low permeability to nitrogen gas and hydrochloric acid. However, such a fluororesin has low melt flowability and thus is difficult to mold. In contrast, the production method of the present invention can provide a molded article having excellently low permeability to nitrogen gas and hydrochloric acid even if a fluororesin to be used has a high MFR and thus has excellent moldability.

The polytetrafluoroethylene (PTFE) preferably has fibrillability, but it may not have fibrillability. The PTFE preferably has non-melt-fabricability. The non-melt-fabricability herein means a characteristic that the melt flow rate cannot be determined at a temperature higher than the crystal melting point in conformity with ASTM D1238 and D2116. The PTFE has a high specific gravity and low permeability, and irradiation can further improve such a specific gravity and such permeability.

The PTFE preferably has a melting point of 325° C. to 347° C. The melting point is the temperature corresponding to the maximum value on a heat-of-fusion curve at a temperature-increasing rate of 10° C./min using a differential scanning calorimeter (DSC).

The PTFE may be a TFE homopolymer consisting only of tetrafluoroethylene (TFE), or may be a modified PTFE containing TFE and a modifying monomer. The modifying monomer may be any monomer copolymerizable with TFE, and examples thereof include perfluoroolefins such as HFP; chlorofluoroolefins such as CTFE; hydrogen-containing fluoroolefins such as trifluoroethylene and VDF; perfluorovinyl ether; perfluoroalkyl ethylenes; and ethylene. One modifying monomer may be used, or multiple modifying monomers may be used.

Examples of the polychlorotrifluoroethylene (PCTFE) include chlorotrifluoroethylene (CTFE) homopolymers and copolymers of a chlorotrifluoroethylene unit ("CTFE unit") and a polymerized unit derived from a monomer (β) copolymerizable with CTFE.

The PCTFE preferably has a melting point of 190° C. to 216° C. The melting point is the temperature corresponding to the maximum value on a heat-of-fusion curve at a temperature-increasing rate of 10° C./min using a differential scanning calorimeter (DSC).

The PCTFE preferably has a flow value of $1 \times 10^{-4}$ to $5 \times 10^{-1}$ (cc/sec). The flow value is a volume of a resin which is molten at 230° C. in a Koka flowtester CFT-500D (Shimadzu Corp.) and extruded through a nozzle (diameter: 1 mmϕ) at 100 kg load per second.

The PCTFE preferably contains 90 to 100 mol % of a CTFE unit. For lower permeability, the amount of the CTFE unit is more preferably 98 to 100 mol %, still more preferably 99 to 100 mol %.

The monomer (β) may be any monomer copolymerizable with CTFE, and examples thereof include TFE, ethylene, VdF, PAVE, and HFP.

The fluororesin may contain a functional group. The functional group may be a functional group present at an end of the main chain or at an end of a side chain of the copolymer, or a functional group present in the main chain or in a side chain.

The functional group present in the main chain is a functional group that directly bonds to a carbon atom of the main chain. The functional group present in a side chain is a functional group that is present in a side chain but not at an end of the side chain. The functional group is preferably a functional group present at an end of the main chain or at an end of a side chain of the copolymer.

The functional group is preferably at least one selected from the group consisting of —CF=CF$_2$, —CF$_2$H, —COF, —COOH, —CHOOCH$_3$, —CONH$_2$, and —CH$_2$OH, more preferably at least one selected from the group consisting of —CH$_2$CF$_2$H, —CH$_2$COF, —CH$_2$COOH, —CH$_2$COOCH$_3$, —CH$_2$CONH$_2$, and —CH$_2$OH, still more preferably at least one selected from the group consisting of —CF$_2$H, —COF, —COOH, and —CH$_2$OH, particularly preferably —CH$_2$OH.

The functional group may also be at least one selected from the group consisting of —CH$_2$—, —CH$_3$, —CH$_2$CH$_3$, —CN, —OCH$_3$, and —SO$_3$H.

Methods of introducing the functional group into a fluororesin are known. Examples thereof include a method of using a chain-transfer agent in polymerization of monomers and a method of using a polymerization initiator for starting polymerization. If methane or ethane is used as a chain-transfer agent, —CH$_3$ or —CH$_2$CH$_3$ is introduced into an end of the main chain of the fluororesin copolymer. If an alcohol is used as a chain-transfer agent, —CH$_2$OH is introduced into an end of the main chain of the copolymer. —CH$_2$OH can also be introduced into an end of the main chain of the copolymer by the use as a polymerization initiator of a peroxide having a —CH$_2$OH structure. If a persulfate is used as a polymerization initiator, a copolymer having —COOH introduced into an end of the main chain is obtained. When this copolymer is brought into contact with ammonia, this —COOH is converted into —CONH$_2$.

The functional group may also be introduced into an end of a side chain of the fluororesin copolymer by polymerizing a monomer having a functional group. The monomer having a functional group is preferably a monomer having at least one selected from the group consisting of —CF=CF$_2$, —CF$_2$H, —COF, —COOH, —COOCH$_3$, —CONH$_2$, and —CH$_2$OH, more preferably a monomer having at least one selected from the group consisting of —CH$_2$CF$_2$H, —OH$_2$COF, —CH$_2$COOH, —CH$_2$COOCH$_3$, —CH$_2$CONH$_2$, and —CH$_2$OH, still more preferably a monomer having —CH$_2$OH.

The monomer having a functional group may be a monomer having at least one selected from the group consisting of —CH$_2$—, —CH$_3$, —CH$_2$CH$_3$, —ON, —OCH$_3$, and —SO$_3$H.

The monomer having a functional group is preferably a monomer (x) represented by the following formula:

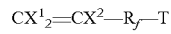

$$CX^1{}_2{=}CX^2{-}R_f{-}T$$

wherein $X^1$ and $X^2$ may be the same as or different from each other, and are each a hydrogen atom or a fluorine atom; $R_f$ is a C1-C40 divalent alkylene group, a C1-C40 fluorine-containing oxyalkylene group, a C2-C40 fluorine-containing alkylene group having an ether bond, or a C2-C40 fluorine-containing oxyalkylene group having an ether bond; and T is any of the above functional groups.

T is preferably at least one selected from the group consisting of —CF=CF$_2$, —CF$_2$H, —COF, —COOH, —COOCH$_3$, —CONH$_2$, and —CH$_2$OH, more preferably at least one selected from the group consisting of —CH$_2$CF$_2$H, —CH$_2$COF, —CH$_2$COOH, —CH$_2$COOCH$_3$, —CH$_2$CONH$_2$, and —CH$_2$OH, still more preferably —CH$_2$OH.

T may also be at least one selected from the group consisting of —CH$_3$, —CH$_2$CH$_3$, —CN, —OCH$_3$, and —SO$_3$H.

The fluororesin may contain 0.01 to 4 mass % of the polymerized unit based on the monomer (x) relative to the sum of the polymerized units based on the monomers other than the monomer (x).

The fluororesin preferably contains 500 or less functional groups per $10^6$ carbon atoms in the main chain. The number of the functional groups is more preferably 400 or less, still more preferably 350 or less. The lower limit thereof is not particularly limited, and may be 0. Too many functional groups may facilitate progress of a crosslinking reaction by the irradiation, possibly causing a failure in producing a modified molded article having excellently low permeability.

In order to give a high specific gravity to the modified molded article, the number of functional groups which promote the crosslinking is preferably small. In contrast, in order to give excellent abrasion resistance to the modified molded article, the number of functional groups which promote the crosslinking is preferably large. The number of functional groups can be selected in consideration of the irradiation temperature and irradiation dose of the radiation.

The functional groups can be identified and the number of functional groups can be determined by infrared spectroscopy.

Specifically, the number of functional groups is determined by the following method.

First, the fluororesin is molten at 330° C. to 340° C. for 30 minutes, and then compression-molded into a film having a thickness of 0.25 to 0.3 mm. This film is analyzed by Fourier transform infrared spectroscopy, whereby the infrared absorption spectrum of the fluororesin is obtained. Then, the difference spectrum is obtained between this infrared absorption spectrum and the base spectrum of a polymer that is completely fluorinated and is free from functional groups. With the absorption peak of a specific functional group appearing in this difference spectrum, the number N of the functional groups per $1 \times 10^6$ carbon atoms of the fluororesin is calculated according to the following formula (A):

$$N = I \cdot K / t \quad (A)$$

wherein
I: absorbance
K: correction coefficient
t: thickness of film (mm).

For reference, the absorption frequencies, molar absorption coefficients, and correction coefficients of the functional groups mentioned herein are shown in the following Table 1. The molar absorption coefficients are values determined from the FT-IR measurement data of a low-molecular-weight model compound.

TABLE 1

| Functional group | Absorption frequency (cm$^{-1}$) | Molar absorption coefficient (l/cm/mol) | Correction coefficient | Model compound |
|---|---|---|---|---|
| —COF | 1883 | 600 | 388 | C$_7$F$_{15}$COF |
| —COOH free | 1815 | 530 | 439 | H(CF$_2$)$_6$COOH |
| —COOH bonded | 1779 | 530 | 439 | H(CF$_2$)$_6$COOH |
| —COOCH$_3$ | 1795 | 680 | 342 | C$_7$F$_{15}$COOCH$_3$ |
| —CONH$_2$ | 3436 | 506 | 460 | C$_7$H$_{15}$CONH$_2$ |
| —CH$_2$OH, —OH | 3648 | 104 | 2236 | C$_7$H$_{15}$CH$_2$OH |
| —CF$_2$H | 3020 | 8.8 | 26485 | H(CF$_2$CF$_2$)$_3$CH$_2$OH |
| —CF=CF$_2$ | 1795 | 635 | 366 | CF$_2$=CF$_2$ |

The absorption frequencies of —CH$_2$CF$_2$H, —CH$_2$COF, —CH$_2$COOH, —CH$_2$COOCH$_3$, and —CH$_2$CONH$_2$ are respectively lower than the absorption frequencies of —CF$_2$H, —COF, —COOH free and —COOH bonded, —COOCH$_3$, and —CONH$_2$, shown in the above table, by several tens of kaysers (cm$^{-1}$).

Thus, for example, the number of the functional groups —COF means the sum of the number determined from the absorption peak at an absorption frequency of 1883 cm$^{-1}$ assigned to —CF$_2$COF and the number determined from the absorption peak at an absorption frequency of 1840 cm$^{-1}$ assigned to —CH$_2$COF.

The fluororesin may be a mixture of the TFE/PAVE copolymer and/or the TFE/HFP copolymer and polytetrafluoroethylene. The mixture may be prepared by adding polytetrafluoroethylene (PTFE) to the TFE/PAVE copolymer, the TFE/HFP copolymer, or the mixture thereof. The mixing may be achieved by any method, such as mixing of liquids each containing an emulsion-dispersed resin, mixing of liquids each containing a solution-dispersed resin, mixing of molten resins, or mixing of resin powders.

The amount of the PTFE in this case is preferably 0.01 to 60 mass %, more preferably 0.05 to 55 mass %, still more preferably 0.1 to 50 mass %, in the fluororesin mixture.

The amount of the PTFE is preferably 20 mass % or less, more preferably 5 mass % or less, still more preferably 1 mass % or less, in the fluororesin mixture.

The PTFE to be added is a TFE homopolymer or a modified PTFE containing more than 99 mass % of TFE and less than 1 mass % of a modifying monomer. Examples of the modifying monomer include hexafluoropropylene (HFP), perfluoro(alkyl vinyl ethers) (PAVE), fluoroalkyl ethylenes, and chlorotrifluoroethylene (CTFE). One modifying monomer may be used, or two or more modifying monomers may be used.

The PTFE preferably has a melting point of 315° C. to 350° C.

The molded article and the modified molded article may further contain other optional components, if necessary. Examples of the optional components include additives such as a crosslinker, an antistatic, a heat-resistance stabilizer, a foaming agent, a foam nucleating agent, an antioxidant, a surfactant, a photo-polymerization initiator, an abrasion inhibitor, and a surface modifier.

If the molded article and the modified molded article contain any optional components such as PTFE, they may favorably be prepared by mixing the fluororesin with the optional components by a known method to provide a mixture thereof, molding the resulting mixture, and irradiating the molded mixture with radiation. The molding may be achieved by the same method as mentioned above, and the irradiation may be achieved by the same method as mentioned above.

The production method of the present invention may further include heat-treating the modified molded article obtained by the irradiation. The presence of this step can lead to further lowering of the permeability to nitrogen gas and hydrochloric acid. The heat-treatment temperature is preferably 230° C. to 270° C., and the heat-treatment time is preferably 5 to 24 hours.

The aforementioned production method can provide a modified molded article. The present invention also relates to a modified molded article obtainable by the aforementioned production method.

The modified molded article has a specific gravity of 2.14 to 2.30. Since the modified molded article has a specific gravity within this range, it has excellently low permeability to nitrogen gas and hydrochloric acid. The specific gravity is preferably 2.15 or higher, and may be 2.18 or lower.

The present invention also relates to a molded article containing a melt-fabricable fluororesin excluding PTFE and PCTFE, containing no inorganic substances or no PTFE, having a specific gravity of 2.170 or higher, and having a breaking strength of 13 MPa or higher (hereinafter, this molded article is also referred to as a molded article (A)).

JP 2006-159524 A and JP 2007-320267 A disclose that the specific gravity of PFA which is a melt-fabricable fluororesin is increased by adding 30 wt % or more of PTFE thereto. However, no molded article containing only a melt-fabricable fluororesin excluding PTFE and PCTFE as the fluororesin and having a specific gravity of 2.170 or higher has been known.

Since the molded article (A) has a specific gravity of 2.170 or higher, it has high breaking strength and excellent abrasion resistance, as well as excellently low permeability to nitrogen gas and hydrochloric acid. The specific gravity may be 2.300 or lower, or may be 2.180 or lower.

The molded article (A) preferably has a melting point of 190° C. to 330° C. The melting point is more preferably 200° C. or higher, still more preferably 220° C. or higher, particularly preferably 280° C. or higher. The melting point is the temperature corresponding to the maximum value on a heat-of-fusion curve at a temperature-increasing rate of 10° C./min using a differential scanning calorimeter (DSC).

The molded article (A) has a breaking strength of 13 MPa or higher. The breaking strength is preferably 15 MPa or higher. The upper limit thereof may be any value, and may be 30 MPa.

The melt-fabricable fluororesin constituting the molded article (A) is more preferably at least one copolymer selected from the group consisting of the aforementioned PFA and FEP, still more preferably the PFA.

The molded article (A) contains neither inorganic substances nor non-melt-fabricable PTFE.

Examples of the inorganic substances include metal materials such as metals which are electrically conductive (e.g., silicon, aluminum, iron, copper, silver, and cobalt), compounds of these metals, and alloys of two or more of these metals.

The PTFE and the PCTFE are the same as those mentioned as examples of the above fluororesin.

The molded article (A) can be favorably produced by the above method for producing a modified molded article of a fluororesin. In particular, the molded article (A) can be easily produced by the above production method with the irradiation temperature being set to 140° C. or higher and the irradiation dose being set to 60 kGy or higher. The number of functional groups and MFR of the fluororesin before the irradiation also affect the specific gravity. Thus, the number of functional groups is preferably small and the MFR is preferably high.

The modified molded article or the molded article (A) preferably has a thickness of 0.01 to 3.0 mm, more preferably 0.2 mm or greater, still more preferably 0.5 mm or greater, while more preferably 2.0 mm or smaller. A molded article having a small thickness is desired to have favorable appearance and high breaking strength, and is also desired to have low permeation coefficients to nitrogen gas and hydrochloric acid because such a molded article is likely to allow nitrogen gas and hydrochloric acid to permeate therethrough. The modified molded article or the molded article (A) has favorable appearance as well as excellently low permeability to nitrogen gas and hydrochloric acid even if the thickness thereof is within the above range.

The modified molded article or the molded article (A) may be in any shape or form, such as pellets, a film, a sheet, a plate, a rod, a block, a cylinder, a container, an electric wire, or a tube. The modified molded article or the molded article (A) may be a fluororesin coating film for forming, for example, a coating layer for cookware, such as an inner pot of a rice cooker, an electric griddle, or a frying pan, or a top coat layer of a fixing roller for an image forming device such as an electrophotographic type or electrostatic recording type copier or a laser printer.

The modified molded article or the molded article (A) is preferably a tube, a film, or a bottle. Tubes, films, and bottles are usually produced by extrusion molding, compression molding, or injection molding, and particularly produced by extrusion molding in many cases. Thus, in tubes, films, and bottles, the polymer chains constituting the fluororesin are oriented in the flowing direction. When these molded articles are heated, they are likely to shrink in the flowing direction. In contrast, even if the modified molded article or the molded article (A) is in the form of a tube, a film, or a bottle, it has favorable appearance.

The modified molded article or the molded article (A) preferably has a nitrogen gas permeation coefficient of $6.5 \times 10^{-11}$ cm$^3$ (STP)·cm/cm$^2$/sec/cmHg or lower.

The modified molded article or the molded article (A) preferably has a hydrochloric acid permeation coefficient of $5.0 \times 10^{-13}$ g·cm/cm$^2$/sec or lower.

The modified molded article or the molded article (A) preferably has a breaking strength of 15 MPa or higher.

The modified molded article or the molded article (A) may be applied to any uses, including the following:

diaphragms of diaphragm pumps, bellows molded articles, electric wire coating materials, semiconductor parts, packings and seals, thin tubes for rollers of copiers, monofilaments, belts, gaskets, optical lens parts, tubes for oil drilling, tubes for geothermal power generation, electric wires for oil drilling, electric wires for satellites, electric wires for nuclear power generation, electric wires for aircraft, films for solar cell panels, gaskets of secondary batteries and electric double layer capacitors, and OA rollers.

The modified molded article or the molded article (A) can be particularly suitably used as a tube for flowing gas or chemicals, a bottle for storing chemicals, a gas bag, a chemical solution bag, a chemical solution container, a bag for freezing, or the like.

The modified molded article or the molded article (A) can be particularly suitably used as a body or part of an on-off valve which may disadvantageously cause generation of particles such as abraded powder due to friction during the use, a sleeve used for connecting a joint and a tube, a screw cap of a chemical solution bottle or container, a gear, a screw, an article including a base (e.g., metal) and a fluororesin covering the base, such as a frying pan, a pot, or a rice cooker, or a release film.

EXAMPLES

The present invention is described in detail below with reference to, but not limited to, reference examples.

The respective parameters in the reference examples were determined by the following methods.
(Amount of Monomer Unit)

The amounts of the respective monomer units were determined by $^{19}$F-NMR.
(MFR)

The mass (g/10 min) of the polymer flowed out of a nozzle (inner diameter: 2 mm, length: 8 mm) per 10 minutes at 372° C. and 5 kg load was determined using a melt indexer (Yasuda Seiki Seisakusho Ltd.) in conformity with ASTM D1238.

(Flow Value)

The volume of a resin which was molten at 230° C. in a Koka flowtester CFT-500D (Shimadzu Corp.) and extruded through a nozzle (diameter: 1 mmϕ) at a 100 kg load per second.

(Number of Functional Groups)

A sample was molten at 330° C. to 340° C. for 30 minutes, and then compression-molded into a film having a thickness of 0.25 to 0.3 mm. This film was scanned 40 times and analyzed using a Fourier transform infrared (FT-IR) spectrometer (trade name: 1760X, PerkinElmer Co., Ltd.), whereby the infrared absorption spectrum of the sample was obtained. Then, the difference spectrum was obtained between this infrared absorption spectrum and the base spectrum of a polymer that is completely fluorinated and is free from functional groups. With the absorption peak of a specific functional group appearing in this difference spectrum, the number N of the functional groups per $1 \times 10^6$ carbon atoms of the sample was calculated according to the following formula (A):

$$N = I \times K / t \quad (A)$$

wherein

I: absorbance

K: correction coefficient t: thickness of film (mm).

For reference, the absorption frequencies, molar absorption coefficients, and correction coefficients of the functional groups mentioned herein are shown in the following Table 2. The molar absorption coefficients are values determined from the FT-IR measurement data of a low-molecular-weight model compound.

TABLE 2

| Functional group | Absorption frequency (cm$^{-1}$) | Molar absorption coefficient (l/cm/mol) | Correction coefficient | Model compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —COOCH$_3$ | 1795 | 680 | 342 | $C_7F_{15}COOCH_3$ |
| —CONH$_2$ | 3436 | 506 | 460 | $C_7H_{15}CONH_2$ |
| —CH$_2$OH, —OH | 3648 | 104 | 2236 | $C_7H_{15}CH_2OH$ |
| —CF$_2$H | 3020 | 8.8 | 26485 | $H(CF_2CF_2)_3CH_2OH$ |
| —CF=CF$_2$ | 1795 | 635 | 366 | $CF_2$=$CF_2$ |

(Specific Gravity)

The specific gravity was determined by the water displacement method.

(MIT Value and MIT Retention)

The parameters were determined in conformity with ASTM D2176. Specifically, a specimen having a width of 12.5 mm and a length of 130 mm before or after irradiated with electron beams was mounted on an MIT tester (model No. 12176, Yasuda Seiki Seisakusho Ltd.). The specimen was folded left and right each at an angle of 135 degrees and a load of 1.25 kg, with a folding rate of 175 times/min. The number of folding motions until the specimen was broken (MIT value) was determined.

The MIT retention was determined by the following formula:

MIT retention (%)=(MIT value after electron beam irradiation/MIT value before electron beam irradiation)×100.

(Breaking Strength and Strength Retention)

The specimen obtained in each of the reference examples and the comparative examples was processed into a dumbbell shape using an ASTM V-shaped dumbbell cutter. With this dumbbell-shaped specimen, the breaking strength was determined at 50 ram/min and 25° C. using an autograph (AGS-J 5 kN, Shimadzu Corp.) in conformity with ASTM D638.

The tube obtained in each of the reference examples and the comparative examples was longitudinally split open and was cut into a dumbbell shape using an ASTM V-shaped dumbbell cutter. With this dumbbell-shaped specimen, the breaking strength was determined at 50 mm/min and 25° C. using an autograph (AGS-J 5 kN, Shimadzu Corp.) in conformity with ASTM D638.

The strength retention was determined by the following formula:

Strength retention (%)=(breaking strength after electron beam irradiation/breaking strength before electron beam irradiation)×100.

(Nitrogen Gas Permeation Coefficient)

The amount of permeation with regard to the nitrogen gas permeation coefficient was determined using a pressure gas permeation tester (Gasperm-100, Jasco Corp.). The measurement was performed using a nitrogen single gas, with a pressure of 0.5 MPa·G applied to the pressure side and with the atmospheric pressure at the permeation side. In this device, a measuring instrument continually monitors the amount of gas permeated, thereby determining the amount of gas permeated per hour. The measurement was performed using a 5-cm-diameter circular sample film cut out of the specimen obtained in each of the reference examples and the comparative examples. The amount of gas permeated per hour, the pressure difference ((pressure at the pressure side)–(the atmospheric pressure)), and the permeation area of the sample were calculated based on the seal ring inner diameter, 3.9 mm.

The nitrogen gas permeation coefficient (cm$^3$ (STP)·cm/cm$^2$/sec/cmHg) was calculated by the following formula:

Permeation coefficient=(amount of gas permeated (cm$^3$)×sheet thickness (cm))/(pressure difference (cmHg)×permeation area of sheet (cm$^2$)×permeation time (sec)).

(Hydrochloric Acid Permeation Coefficient)

The hydrochloric acid permeation coefficient of the specimen or tube obtained in each of the reference examples and the comparative examples was determined by the method of measuring the hydrochloric acid permeation coefficient disclosed in JP 4569568 B using 35 mass % hydrochloric acid.

The concentration Y (ppm) of chlorine ions contained in pure water permeated was quantified using an ion chromatograph (trade name: IC7000-E, Yokogawa Electric Corp.).

The hydrochloric acid permeation coefficient X (g·cm/cm$^2$/sec) was calculated by the following formula:

$$X = (\beta \times \text{thickness})/\text{cross-sectional area}$$

wherein $\beta$: the slope during the period ($T_\beta$) in which $\alpha$ linearly varies relative to T when plotting the a values relative to T $\alpha$: total amount permeated (unit: g)=$Y \times W \times 10^{-6}$ (unit: g/sec)

W: amount of pure water (unit: ml)

T: time elapsed from start of permeation to sampling (unit: sec)

Thickness: thickness of specimen or thickness of tube (unit: cm)

Cross-sectional area: area of portion where specimen or tube is in contact with pure water in permeation tester (unit: cm²).

(Abrasion Test)

The abrasion test was performed using a color fastness rubbing tester (Yasuda Seiki Seisakusho Ltd.), and the weights before and after the test were measured.

Specimen: 220 mm in length, 30 mm in width
Abrasive paper: copy paper (20 mm×20 mm)
Load: 1.96 N
Rubbing distance: 120 mm
Rubbing rate: 30 reciprocations/min

Reference Example 1

PFA pellets (MFR=22.0 (g/10 min), compositional ratio: TFE/HFP/PPVE=94.1/0.0/5.9 (mass %)) were molded into a disc-like sheet having a diameter of 120 mm and a thickness of 1.5 mm using a heat-press molding machine, whereby a specimen was obtained.

The resulting specimen was contained in an electron beam irradiation container of an electron beam irradiating device (NHV Corp.), and then nitrogen gas was introduced into the container so that the container was under nitrogen atmosphere. The temperature inside the container was increased up to 180° C. and stabilized. Thereafter, the specimen was irradiated with 60 kGy of electron beams at an electron beam accelerating voltage of 3000 kV and an irradiation intensity of 20 kGy/5 min. The dimensional change of the specimen before and after the electron beam irradiation was 1% or lower and no crease occurred.

The specimen irradiated with electron beams was then subjected to the measurements of specific gravity and nitrogen gas permeation coefficient. Table 3 shows the results.

The number of functional groups in the copolymer (before irradiation) used in Reference Example 1 was 321 (per $10^6$ carbon atoms) (specifically, $CH_2OH$: 150, COF: 17, COOH: 154).

Comparative Example 1

A specimen was obtained in the same manner as in Reference Example 1 except that no electron beam irradiation was performed. The specimen was then subjected to the measurements of specific gravity, MIT value, MIT retention, breaking strength, strength retention, and nitrogen gas permeation coefficient. Table 3 shows the results.

Reference Examples 2 and 3, Comparative Example 2

A specimen was obtained in the same manner as in Reference Example 1 except that the electron beam irradiation was performed at an irradiation temperature and an irradiation dose shown in Table 3. The specimen irradiated with electron beams was then subjected to the measurements of specific gravity, MIT value, MIT retention, breaking strength, strength retention, and nitrogen gas permeation coefficient. Table 3 shows the results. In each of Reference Examples 2 and 3, the dimensional change of the specimen before and after the electron beam irradiation was 1% or lower and no crease occurred. In Comparative Example 2, the dimensional change (shrinkage) of the specimen before and after the electron beam irradiation was 1.5% or higher.

Reference Examples 4 to 8, Comparative Examples 4 and 5

A specimen was obtained in the same manner as in Reference Example 1 except that PFA pellets (MFR=26.0 (g/10 min), compositional ratio: TFE/HFP/PPVE=94.4/0.0/5.6 (mass %)) were used and the electron beam irradiation was performed at an irradiation temperature and an irradiation dose shown in Table 4. The specimen irradiated with electron beams was then subjected to the measurements of specific gravity, breaking strength, strength retention, and nitrogen gas permeation coefficient. Table 4 shows the results. In each of Reference Examples 4 to 8, the dimensional change of the specimen before and after the electron beam irradiation was 1% or lower and no crease occurred.

The number of functional groups in the copolymer (before irradiation) used in Reference Examples 4 to 8 and Comparative Examples 4 and 5 was 69 (per $10^6$ carbon atoms) (specifically, $CH_2OH$: 0, COF: 17, COOH: 52).

Comparative Example 3

A specimen was obtained in the same manner as in Reference Example 4 except that the electron beam irradiation was not performed. The specimen was then subjected to the measurements of specific gravity, breaking strength, strength retention, and nitrogen gas permeation coefficient. Table 4 shows the results.

Reference Example 9

PFA pellets (MFR=2.2 (g/10 min), compositional ratio: TFE/HFP/PPVE=96.9/0.0/3.1 (mass %)) were molded through a tube extruder, whereby a tube having an outer diameter of 12 mm and a thickness of 1.0 mm was obtained.

The resulting tube was cut into a size of 40 cm in length and contained in an electron beam irradiation container of an electron beam irradiation device (NHV Corp.). Then, nitrogen gas was introduced into the container so that the container was under nitrogen atmosphere. The temperature inside the container was increased up to 83° C. and stabilized. Thereafter, the tube was irradiated with 60 kG of electron beams at an electron beam accelerating voltage of 3000 kV and an irradiation intensity of 20 kGy/5 min. The dimensional change of the tube before and after the electron beam irradiation was 1% or lower and no crease occurred.

The tube irradiated with electron beams was then subjected to the measurements of specific gravity, breaking strength, strength retention, and hydrochloric acid permeation coefficient. Table 5 shows the results.

The number of functional groups in the copolymer (before irradiation) used in Reference Example 9 was 8 (per $10^6$ carbon atoms) (specifically, $CH_2OH$: 0, COF: 2, COOH: 6).

Comparative Example 6

A tube was obtained in the same manner as in Reference Example 9 except that the electron beam irradiation was not performed. The tube was then subjected to the measurements of specific gravity, breaking strength, strength retention, and hydrochloric acid permeation coefficient. Table 5 shows the results.

Reference Examples 10 and 11, Comparative Example 7

A tube was obtained in the same manner as in Reference Example 9 except that the electron beam irradiation was performed at the irradiation temperature and the irradiation dose shown in Table 5. The tube irradiated with electron beams was then subjected to the measurements of specific gravity, breaking strength, strength retention, and hydrochloric acid permeation coefficient. Table 5 shows the results. In each of Reference Examples 10 and 11, the dimensional change of the tube before and after the electron beam irradiation was 1% or lower and no crease occurred.

Reference Examples 12 to 14

A tube was obtained in the same manner as in Reference Example 9 except that PFA pellets (MFR=2.1 (g/10 min), compositional ratio: TFE/HFP/PPVE=94.5/0.0/5.5 (mass %)) were used and the electron beam irradiation was performed at the irradiation temperature and the irradiation dose shown in Table 6. The tube irradiated with electron beams was then subjected to the measurements of specific gravity, breaking strength, and strength retention. Table 6 shows the results. In each of Reference Examples 12 to 14, the dimensional change of the tube before and after the electron beam irradiation was 1% or lower and no crease occurred.

The number of functional groups in the copolymer (before irradiation) used in Reference Examples 12 to 14 was 6 (per $10^6$ carbon atoms) (specifically, $CH_2OH$: 0, COF: 2, COOH: 4).

Comparative Example 8

A tube was obtained in the same manner as in Reference Example 12 except that the electron beam irradiation was not performed. The tube was then subjected to the measurements of specific gravity, breaking strength, and strength retention. Table 6 shows the results.

Reference Examples 15 to 18

A specimen was obtained in the same manner as in Reference Example 1 except that PFA pellets (MFR=2.2 (g/10 min), compositional ratio: TFE/HFP/PPVE=96.9/0.0/3.1 (mass %)) were used and the electron beam irradiation was performed at the irradiation temperature and the irradiation dose shown in Table 7. The specimen irradiated with electron beams was then subjected to the measurements of specific gravity, breaking strength, strength retention, nitrogen gas permeation coefficient, and hydrochloric acid permeation coefficient. Table 7 shows the results. In each of Reference Examples 15 to 18, the dimensional change of the specimen before and after the electron beam irradiation was 1% or lower and no crease occurred.

The number of functional groups in the copolymer (before irradiation) used in Reference Examples 15 to 18 was 8 (per $10^6$ carbon atoms) (specifically, $CH_2OH$: 0, COF: 2, COOH: 6).

Comparative Example 9

A specimen was obtained in the same manner as in Reference Example 15 except that the electron beam irradiation was not performed. The specimen was then subjected to the measurements of specific gravity, breaking strength, strength retention, nitrogen gas permeation coefficient, and hydrochloric acid permeation coefficient. Table 7 shows the results.

Reference Examples 19 to 21

A specimen was obtained in the same manner as in Reference Example 1 except that PFA pellets (MFR=2.2 (g/10 min), compositional ratio: TFE/HFP/PPVE=96.6/0.0/3.4 (mass %)) were used and the electron beam irradiation was performed at the irradiation temperature and the irradiation dose shown in Table 8. The specimen irradiated with electron beams was then subjected to the measurements of specific gravity, breaking strength, strength retention, and nitrogen gas permeation coefficient. Table 8 shows the results. In each of Reference Examples 19 to 21, the dimensional change of the specimen before and after the electron beam irradiation was 1% or lower and no crease occurred.

The number of functional groups in the copolymer (before irradiation) used in Reference Examples 19 to 21 was 60 (per $10^6$ carbon atoms) (specifically, $CH_2OH$: 13, COF: 28, COOH: 19).

Comparative Example 10

A specimen was obtained in the same manner as in Reference Example 19 except that the electron beam irradiation was not performed. The specimen was then subjected to the measurements of specific gravity, breaking strength, strength retention, and nitrogen gas permeation coefficient. Table 8 shows the results.

Reference Examples 22 to 25

A specimen was obtained in the same manner as in Reference Example 1 except that PTFE pellets (MFR<0.1 (g/10 min), compositional ratio: TFE/HFP/PPVE=100/0.0/0.0 (mass %)) were used and the electron beam irradiation was performed at the irradiation temperature and the irradiation dose shown in Table 9. The specimen irradiated with electron beams was then subjected to the measurements of specific gravity, breaking strength, strength retention, and nitrogen gas permeation coefficient. Table 9 shows the results. In each of Reference Examples 22 to 25, the dimensional change of the specimen before and after the electron beam irradiation was 1% or lower and no crease occurred.

The number of functional groups in the copolymer (before irradiation) used in Reference Examples 22 to 25 was 0 (per $10^6$ carbon atoms) (specifically, $CH_2OH$: 0, COF: 0, COOH: 0).

Comparative Example 11

A specimen was obtained in the same manner as in Reference Example 22 except that the electron beam irradiation was not performed. The specimen was then subjected to the measurements of specific gravity, breaking strength, strength retention, and nitrogen gas permeation coefficient. Table 9 shows the results.

Reference Examples 26 to 29

A specimen was obtained in the same manner as in Reference Example 1 except that PCTFE pellets (flow value=$1.0 \times 10^{-3}$ (cc/sec), compositional ratio: CTFE=100 (mass %)) were used and the electron beam irradiation was performed at the irradiation temperature and the irradiation dose shown in Table 10. The specimen irradiated with electron beams was then subjected to the measurements of specific gravity, breaking strength, strength retention, and nitrogen gas permeation coefficient. Table 10 shows the results. In each of Reference Examples 26 to 29, the dimensional change of the specimen before and after the electron beam irradiation was 1% or lower and no crease occurred.

The number of functional groups in the copolymer (before irradiation) used in Reference Examples 26 to 29 was 0 (per $10^6$ carbon atoms) (specifically, $CH_2OH$: 0, COF: 0, COOH: 0).

Comparative Example 12

A specimen was obtained in the same manner as in Reference Example 26 except that the electron beam irradiation was not performed. The specimen was then subjected to the measurements of specific gravity, breaking strength, strength retention, and nitrogen gas permeation coefficient. Table 10 shows the results.

Reference Examples 30 to 33

A tube was obtained in the same manner as in Reference Example 9 except that FEP pellets (MFR=3.0 (g/10 min), compositional ratio: TFE/HFP/PPVE=89.0/11.0/0.0 (mass %)) were used and the electron beam irradiation was performed at the irradiation temperature and the irradiation dose shown in Table 11. The tube irradiated with electron beams was then subjected to the measurements of specific gravity, breaking strength, strength retention, and hydrochloric acid permeation coefficient. Table 11 shows the results. In each of Reference Examples 30 to 33, the dimensional change of the tube before and after the electron beam irradiation was 1% or lower and no crease occurred.

The number of functional groups in the copolymer (before irradiation) used in Reference Examples 30 to 33 was 18 (per $10^6$ carbon atoms) (specifically, $CH_2OH$: 0, COF: 0, COOH: 18).

Comparative Example 13

A tube was obtained in the same manner as in Reference Example 30 except that the electron beam irradiation was not performed. The tube was then subjected to the measurements of specific gravity, breaking strength, strength retention, and hydrochloric acid permeation coefficient. Table 11 shows the results.

Reference Examples 34 and 35, Comparative Examples 14 and 15

A specimen was obtained in the same manner as in Reference Example 1 except that the same PFA pellets as in Reference Example 15 were used and the electron beam irradiation was performed at the irradiation temperature and the irradiation dose as shown in Table 12. The specimen irradiated with electron beams was then subjected to the abrasion resistance test. Table 12 shows the results.

Reference Example 36, Comparative Examples 16 to 19

A specimen was obtained in the same manner as in Reference Example 1 except that the same PFA pellets as in Reference Example 19 were used and the electron beam irradiation was performed at the irradiation temperature and the irradiation dose as shown in Table 13. The specimen irradiated with electron beams was then subjected to the abrasion resistance test. Table 13 shows the results.

TABLE 3

| | Irradiation temperature (° C.) | Irradiation dose (kGy) | Melting point (° C.) | Specific gravity | MIT value (sample thickness: 0.22 mm) (Times) | MIT retention (%) | Breaking strength (sample thickness: 1.5 mm) (MPa) | Strength retention (%) | Nitrogen gas permeation coefficient (sample thickness: 1.5 mm) ($cm^3$(STP) · $cm/cm^2/sec/cmHg$) |
|---|---|---|---|---|---|---|---|---|---|
| Comparative Example 1 | Not treated | Not treated | 298 | 2.139 | 55,600 | 100 | 31 | 100 | $6.9 \times 10^{-11}$ |
| Reference Example 1 | 180 | 60 | 299 | 2.158 | — | — | — | — | $4.4 \times 10^{-11}$ |
| Reference Example 2 | 200 | 20 | 299 | 2.148 | 125,700 | 226 | 30 | 97 | $5.6 \times 10^{-11}$ |
| Reference Example 3 | 200 | 60 | 299 | 2.159 | 125,700 | 226 | 28 | 90 | $4.2 \times 10^{-11}$ |
| Comparative Example 2 | 230 | 100 | 299 | 2.166 | 1,800 | 3 | 19 | 61 | $3.6 \times 10^{-11}$ |

TABLE 4

| | Irradiation temperature (° C.) | Irradiation dose (kGy) | Melting point (° C.) | Specific gravity | Breaking strength (sample thickness: 1.5 mm) (MPa) | Strength retention (%) | Nitrogen gas permeation coefficient (sample thickness: 1.5 mm) ($cm^3$(STP) · $cm/cm^2/sec/cmHg$) |
|---|---|---|---|---|---|---|---|
| Comparative Example 3 | Not treated | Not treated | 299 | 2.141 | 30 | 100 | $6.6 \times 10^{-11}$ |
| Comparative Example 4 | 25 | 40 | 301 | 2.145 | — | — | — |
| Reference Example 4 | 50 | 40 | 301 | 2.152 | — | — | $4.5 \times 10^{-11}$ |
| Reference Example 5 | 83 | 60 | 301 | 2.160 | 22 | 73 | $4.1 \times 10^{-11}$ |
| Reference Example 6 | 147 | 60 | 301 | 2.174 | — | — | $2.9 \times 10^{-11}$ |

TABLE 4-continued

| | Irradiation temperature (° C.) | Irradiation dose (kGy) | Melting point (° C.) | Specific gravity — | Breaking strength (sample thickness: 1.5 mm) (MPa) | Strength retention (%) | Nitrogen gas permeation coefficient (sample thickness: 1.5 mm) ($cm^3$(STP) · $cm/cm^2/sec/cmHg$) |
|---|---|---|---|---|---|---|---|
| Reference Example 7 | 200 | 20 | 301 | 2.159 | 19 | 63 | $4.2 \times 10^{-11}$ |
| Reference Example 8 | 200 | 60 | 302 | 2.174 | 18 | 60 | $2.9 \times 10^{-11}$ |
| Comparative Example 5 | 200 | 100 | 302 | 2.182 | 12 | 40 | $2.4 \times 10^{-11}$ |

TABLE 5

| | Irradiation temperature (° C.) | Irradiation dose (kGy) | Melting point (° C.) | Specific gravity — | Breaking strength (sample thickness: 1.0 mm) (MPa) | Strength retention (%) | Hydrochloric acid permeation coefficient (sample thickness: 1.0 mm) (g · $cm/cm^2/sec$) |
|---|---|---|---|---|---|---|---|
| Comparative Example 6 | Not treated | Not treated | 305 | 2.126 | 27 | 100 | $6.0 \times 10^{-13}$ |
| Reference Example 9 | 80 | 40 | 308 | 2.144 | — | — | — |
| Reference Example 10 | 180 | 20 | 308 | 2.155 | — | — | $2.1 \times 10^{-13}$ |
| Reference Example 11 | 180 | 60 | 309 | 2.177 | 16 | 59 | $9.0 \times 10^{-14}$ |
| Comparative Example 7 | 180 | 100 | 309 | 2.192 | 8 | 30 | $5.2 \times 10^{-14}$ |

TABLE 6

| | Irradiation temperature (° C.) | Irradiation dose (kGy) | Melting point (° C.) | Specific gravity — | Breaking strength (sample thickness: 1.0 mm) (MPa) | Strength retention (%) |
|---|---|---|---|---|---|---|
| Comparative Example 8 | Not treated | Not treated | 303 | 2.124 | 36 | 100 |
| Reference Example 12 | 80 | 40 | 304 | 2.150 | 27 | 75 |
| Reference Example 13 | 180 | 40 | 305 | 2.155 | 25 | 70 |
| Reference Example 14 | 180 | 60 | 305 | 2.168 | 23 | 64 |

TABLE 7

| | Irradiation temperature (° C.) | Irradiation dose (kGy) | Melting point (° C.) | Specific gravity — | Breaking strength (sample thickness: 1.5 mm) (MPa) | Strength retention (%) | Nitrogen gas permeation coefficient (sample thickness: 1.5 mm) ($cm^3$(STP) · $cm/cm^2/sec/cmHg$) | Hydrochloric acid permeation coefficient (sample thickness: 1.5 mm) (g · $cm/cm^2/sec$) |
|---|---|---|---|---|---|---|---|---|
| Comparative Example 9 | Not treated | Not treated | 305 | 2.134 | 34 | 100 | $7.9 \times 10^{-11}$ | $4.5 \times 10^{-13}$ |
| Reference Example 15 | 80 | 40 | 306 | 2.143 | 26 | 76 | $6.3 \times 10^{-11}$ | $3.2 \times 10^{-13}$ |
| Reference Example 16 | 80 | 80 | 306 | 2.145 | — | — | $6.0 \times 10^{-11}$ | $3.0 \times 10^{-13}$ |
| Reference Example 17 | 180 | 40 | 307 | 2.156 | 24 | 70 | $4.6 \times 10^{-11}$ | $2.0 \times 10^{-13}$ |
| Reference Example 18 | 180 | 80 | 308 | 2.173 | 19 | 55 | $3.0 \times 10^{-11}$ | $1.0 \times 10^{-13}$ |

TABLE 8

| | Irradiation temperature (° C.) | Irradiation dose (kGy) | Melting point (° C.) | Specific gravity | Breaking strength (sample thickness: 1.5 mm) (MPa) | Strength retention (%) | Nitrogen gas permeation coefficient (sample thickness: 1.5 mm) ($cm^3$(STP) · cm/$cm^2$/sec/cmHg) |
|---|---|---|---|---|---|---|---|
| Comparative Example 10 | Not treated | Not treated | 305 | 2.133 | 30 | 100 | $8.0 \times 10^{-11}$ |
| Reference Example 19 | 180 | 40 | 307 | 2.153 | — | — | $6.0 \times 10^{-11}$ |
| Reference Example 20 | 180 | 60 | 306 | 2.145 | 18 | 61 | $4.9 \times 10^{-11}$ |
| Reference Example 21 | 180 | 80 | 308 | 2.159 | 16 | 52 | $4.2 \times 10^{-11}$ |

TABLE 9

| | Irradiation temperature (° C.) | Irradiation dose (kGy) | Melting point (° C.) | Specific gravity | Breaking strength (sample thickness: 1.5 mm) (MPa) | Strength retention (%) | Nitrogen gas permeation coefficient (sample thickness: 1.5 mm) ($cm^3$(STP) · cm/$cm^2$/sec/cmHg) |
|---|---|---|---|---|---|---|---|
| Comparative Example 11 | Not treated | Not treated | 326 | 2.190 | 45 | 100 | $2.0 \times 10^{-11}$ |
| Reference Example 22 | 80 | 40 | 327 | 2.203 | 33 | 73 | $1.5 \times 10^{-11}$ |
| Reference Example 23 | 80 | 80 | 327 | 2.243 | — | — | $5.7 \times 10^{-12}$ |
| Reference Example 24 | 180 | 40 | 327 | 2.219 | — | — | $1.0 \times 10^{-11}$ |
| Reference Example 25 | 180 | 80 | 328 | 2.232 | 23 | 50 | $7.3 \times 10^{-12}$ |

TABLE 10

| | Irradiation temperature (° C.) | Irradiation dose (kGy) | Melting point (° C.) | Specific gravity | Breaking strength (sample thickness: 1.5 mm) (MPa) | Strength retention (%) | Nitrogen gas permeation coefficient (sample thickness: 1.5 mm) ($cm^3$(STP) · cm/$cm^2$/sec/cmHg) |
|---|---|---|---|---|---|---|---|
| Comparative Example 12 | Not treated | Not treated | 212 | 2.119 | 40 | 100 | $4.0 \times 10^{-13}$ |
| Reference Example 26 | 80 | 40 | 213 | 2.129 | 28 | 70 | $2.5 \times 10^{-13}$ |
| Reference Example 27 | 80 | 80 | 214 | 2.130 | 26 | 65 | $2.4 \times 10^{-13}$ |
| Reference Example 28 | 180 | 40 | 215 | 2.148 | — | — | $1.0 \times 10^{-13}$ |
| Reference Example 29 | 180 | 80 | 214 | 2.139 | 22 | 54 | $2.2 \times 10^{-13}$ |

TABLE 11

| | Irradiation temperature (° C.) | Irradiation dose (kGy) | Melting point (° C.) | Specific gravity | Breaking strength (sample thickness: 1.0 mm) (MPa) | Strength retention (%) | Hydrochloric acid permeation coefficient (sample thickness: 1.0 mm) (g · cm/$cm^2$/sec) |
|---|---|---|---|---|---|---|---|
| Comparative Example 13 | Not treated | Not treated | 271 | 2.131 | 27 | 100 | $5.0 \times 10^{-13}$ |
| Reference Example 30 | 80 | 40 | 272 | 2.146 | — | — | — |
| Reference Example 31 | 180 | 40 | 273 | 2.162 | — | — | — |

TABLE 11-continued

|  | Irradiation temperature (° C.) | Irradiation dose (kGy) | Melting point (° C.) | Specific gravity | Breaking strength (sample thickness: 1.0 mm) (MPa) | Strength retention (%) | Hydrochloric acid permeation coefficient (sample thickness: 1.0 mm) (g · cm/cm$^2$/sec) |
|---|---|---|---|---|---|---|---|
| Reference Example 32 | 180 | 40 | 274 | 2.165 | 24 | 89 | $1.4 \times 10^{-13}$ |
| Reference Example 33 | 200 | 40 | 274 | 2.166 | 27 | 100 | $1.4 \times 10^{-13}$ |

TABLE 12

Sample thickness: 40 μm

|  | Comparative Example 14 | Reference Example 34 | Reference Example 35 | Comparative Example 15 |
|---|---|---|---|---|
| Irradiation temperature (° C.) | Not treated | 180 | 180 | 240 |
| Irradiation dose (kGy) | Not treated | 40 | 80 | 40 |
| Specific gravity | 2.121 | 2.152 | 2.172 | — |
| Weight loss (mg) Abrasion test 3000 reciprocations | 4.5 | 1.0 | 1.8 | Sheet deformed |
| Weight loss (mg) Abrasion test 6000 reciprocations | 6.8 | 1.7 | 3.9 | Sheet deformed |

TABLE 13

Sample thickness: 250 μm

|  | Comparative Example 16 | Comparative Example 17 | Reference Example 36 | Comparative Example 18 | Comparative Example 19 |
|---|---|---|---|---|---|
| Irradiation temperature (° C.) | Not treated | 120 | 180 | 180 | 180 |
| Irradiation dose (kGy) | Not treated | 100 | 80 | 100 | 200 |
| Specific gravity | 2.132 | 2.161 | 2.158 | 2.165 | 2.175 |
| Weight loss (mg) Abrasion test 3000 reciprocations | 1.1 | 1.2 | 0.1 or less | 2.6 | 3.7 |
| Weight loss (mg) Abrasion test 6000 reciprocations | 3.5 | 1.4 | 0.1 or less | 5.1 | 8.0 |

The invention claimed is:

1. A method for producing a modified molded article comprising:
   molding a fluororesin to provide a molded article; and
   irradiating the molded article with radiation at an irradiation dose of lower than 100 kGy at an irradiation temperature of 50° C. to 200° C. and that is also lower than the melting point of the fluororesin to provide a modified molded article.

2. The production method according to claim 1, wherein the molded article has a thickness of 0.01 to 3.0 mm.

3. The production method according to claim 1, wherein the molded article is a tube, a film, or a bottle.

4. The production method according to claim 1, wherein the modified molded article has a specific gravity of 2.14 to 2.30.

5. The production method according to claim 1, wherein the fluororesin is a melt-fabricable fluororesin.

6. The production method according to claim 1, wherein the fluororesin is a tetrafluoroethylene/perfluoro (alkyl vinyl ether) copolymer.

7. The production method according to claim 1, wherein the fluororesin contains 0 to 500 functional groups per $10^6$ carbon atoms in the main chain.

8. A modified molded article which is obtainable by the production method according to claim 1.

* * * * *